United States Patent
Sipilä et al.

(10) Patent No.: US 8,043,136 B2
(45) Date of Patent: Oct. 25, 2011

(54) ARRANGEMENT FOR AND METHOD OF PROVIDING COOLING ENERGY TO A COOLING MEDIUM CIRCUIT OF A MARINE VESSEL

(75) Inventors: Tuomas Sipilä, Turku (FI); Oskar Levander, Turku (FI)

(73) Assignee: Wärtsilä Finland Oy, Vaasa (FI)

( * ) Notice: Subject to any disclaimer, the term of this patent is extended or adjusted under 35 U.S.C. 154(b) by 507 days.

(21) Appl. No.: 12/159,375

(22) PCT Filed: Oct. 4, 2006

(86) PCT No.: PCT/FI2006/050425
§ 371 (c)(1),
(2), (4) Date: Jun. 26, 2008

(87) PCT Pub. No.: WO2007/074210
PCT Pub. Date: Jul. 5, 2007

(65) Prior Publication Data
US 2008/0299848 A1    Dec. 4, 2008

(30) Foreign Application Priority Data
Dec. 28, 2005   (FI) .................................... 20055707

(51) Int. Cl.
*F02B 61/04*   (2006.01)

(52) U.S. Cl. ....................... 440/88 F; 62/240

(58) Field of Classification Search ............. 440/88 F; 62/7, 45.1, 240, 613, 614, 50.2, 50.5
See application file for complete search history.

(56) References Cited

U.S. PATENT DOCUMENTS

| | | | | |
|---|---|---|---|---|
| 3,762,175 A | * | 10/1973 | Jones | 62/45.1 |
| 3,864,918 A | * | 2/1975 | Lorenz | 60/651 |
| 5,327,730 A | * | 7/1994 | Myers et al. | 62/614 |
| 5,386,699 A | * | 2/1995 | Myers et al. | 62/613 |
| 5,560,212 A | * | 10/1996 | Hansen | 62/7 |
| 6,058,713 A | * | 5/2000 | Bowen et al. | 62/7 |

FOREIGN PATENT DOCUMENTS

| | | |
|---|---|---|
| DE | 3225300 | 1/1984 |
| DE | 19940367 | 3/2001 |
| EP | 0252328 | 1/1988 |
| EP | 1043551 | 10/2000 |
| GB | 766128 | 1/1957 |
| JP | 2000146091 | 5/2000 |
| JP | 2001116198 | 4/2001 |
| JP | 2004330831 | 11/2004 |
| WO | 9638656 | 12/1996 |
| WO | 2004031644 | 4/2004 |

* cited by examiner

*Primary Examiner* — Lars A Olson
(74) *Attorney, Agent, or Firm* — Chernoff, Vilhauer, McClung & Stenzel

(57) ABSTRACT

Arrangement for providing cooling energy to a cooling medium circuit of a marine vessel having a storage of liquefied gas, the arrangement having a gas feeding system being provided with gas evaporation/heating apparatus. The gas evaporation/heating apparatus is arranged in heat transfer connection with the cooling medium circuit of the vessel through an intermediate flow circuit.

1 Claim, 3 Drawing Sheets

US 8,043,136 B2

ARRANGEMENT FOR AND METHOD OF PROVIDING COOLING ENERGY TO A COOLING MEDIUM CIRCUIT OF A MARINE VESSEL

This is a national stage application filed under 35 USC 371 based on International Application No. PCT/FI2006/050425 filed Oct. 4, 2006, and claims priority under 35 USC 119 of Finnish Patent Application No. 20055707 filed Dec. 28, 2005.

TECHNICAL FIELD

The invention relates to marine vessels being operated with gaseous fuel. The invention particularly relates to an arrangement for providing cooling energy to a HVAC facility of a marine vessel having a storage of liquefied gas, the arrangement having a gas feeding system being provided with gas evaporation/heating apparatus. Invention relates also to a method of cooling a HVAC facility of a marine vessel having a storage of liquefied gas, in which method liquefied gas is evaporated and/or heated by a gas evaporation/heating apparatus.

BACKGROUND ART

In a marine vessel operated by using liquefied gas such as LNG (=Liquefied Natural Gas) the fuel is normally stored in tank approximately at a temperature of minus 162° C. in liquid form. Before feeding to an engine the liquid fuel must be evaporated into gaseous form and also heated to suitable level, which requires heat energy.

Particularly in passenger cruisers there are several entities in which a process medium must be cooled or in connection with which heat should be extracted, like cold storage rooms etc. These both actions require work to be done which consumes energy. Additionally the targets in which the cool is needed are usually widely distributed in the vessel.

An object of the invention is to provide an arrangement and a method, which simultaneously provides a solution to both of the problems with minimized energy consumption.

DISCLOSURE OF THE INVENTION

The basic idea of the invention is to utilize the low temperature of liquefied gas for providing cooling energy to a cooling medium circuit of a marine vessel and providing a flow circuit for distributing to cooling energy to various targets.

In the arrangement for providing cooling energy to a cooling medium circuit of a marine vessel having a storage of liquefied gas having a gas feeding system being provided with gas evaporation/heating apparatus, the gas evaporation/heating apparatus is arranged in heat transfer connection with the cooling medium circuit of the vessel through an intermediate flow circuit. The intermediate flow circuit makes it possible to distribute cooling energy widely and safely by making use of non-toxic fluid as water in the cooling medium circuit. The invention also minimizes the required volume of higher grade fluid (as refrigerant) in the intermediate flow circuit.

Advantageously the arrangement comprises the first heat exchanger in connection with the intermediate flow circuit, the intermediate flow circuit being in connection with the gas evaporation/heating apparatus and the first heat exchanger is in connection with the cooling medium circuit for transferring heat between the evaporated/heated gas and the cooling medium circuit.

The marine vessel may have its propulsion system utilizing liquefied gas as fuel, the arrangement having a fuel feeding system being provided with gas evaporation/heating apparatus.

According to a another embodiment of the invention the first flow circuit is provided with a second heat exchanger being in heat transfer connection with sea water for bringing further heat to the first flow circuit. In this case the first flow circuit is provided with a by-pass duct parallel to the second heat exchanger. The cooling medium circuit is in connection with a HVAC system supplying air to selected locations in the marine vessel. The cooling medium circuit may also be in connection with a cold store of the vessel.

Method of cooling a HVAC system of a marine vessel having a storage of liquefied gas, in which method liquefied gas is evaporated and/or heated by a gas evaporation/heating apparatus, the method being characterised in that at least part of the evaporation heat is transferred from the HVAC system of a marine vessel being in connection with the gas evaporation/heating apparatus in an indirect manner through an intermediate flow circuit. With the present invention lower electrical power need of AC-compressors of the marine vessel, as well as saving of fuel is obtained and thus also lower total costs and lower emissions.

BRIEF DESCRIPTION OF DRAWINGS

In the following the invention will be described with the reference to the accompanying schematic drawing, in which.

BEST MODE FOR CARRYING OUT THE INVENTION

Figure 1:
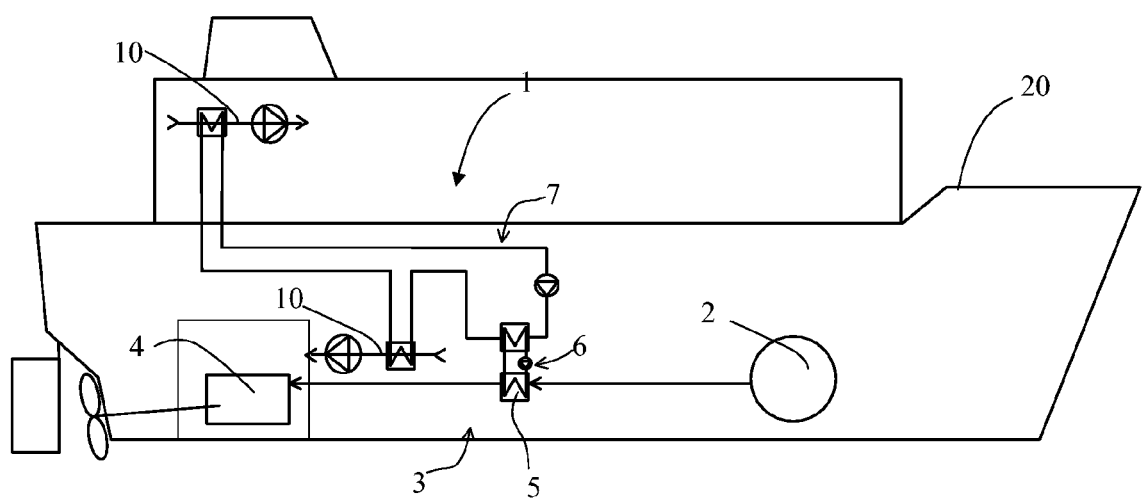
FIG. 1 illustrates an embodiment of the invention in a marine vessel.
Figure 2:
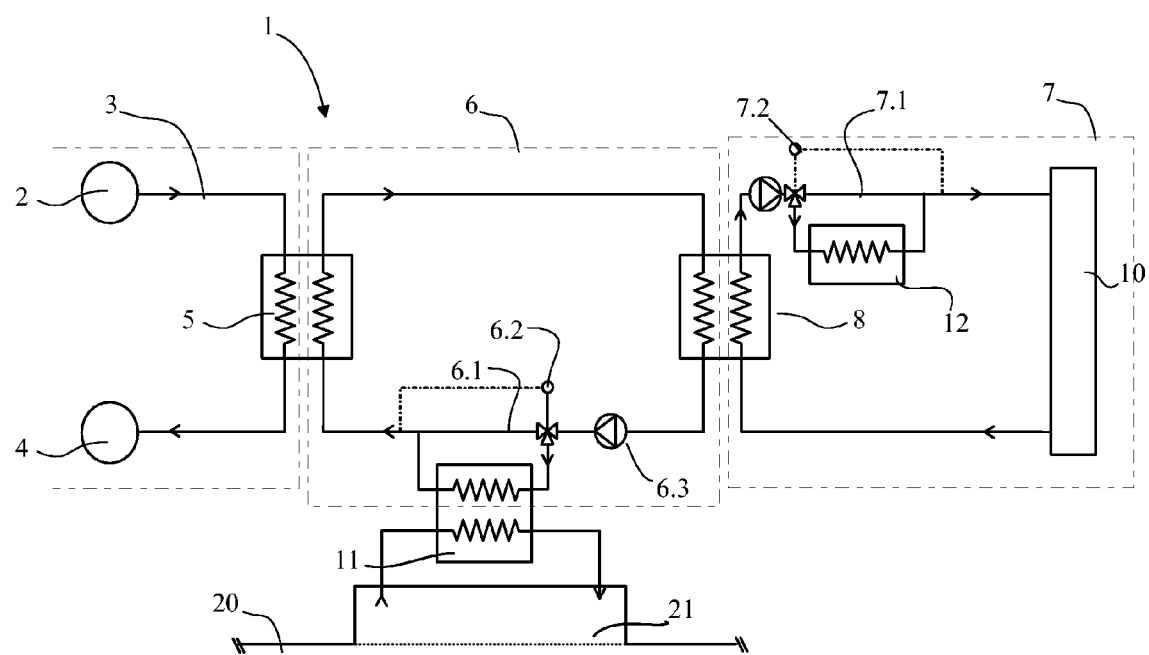
FIG. 2 illustrates a flow chart of an embodiment of the invention.
Figure 3:
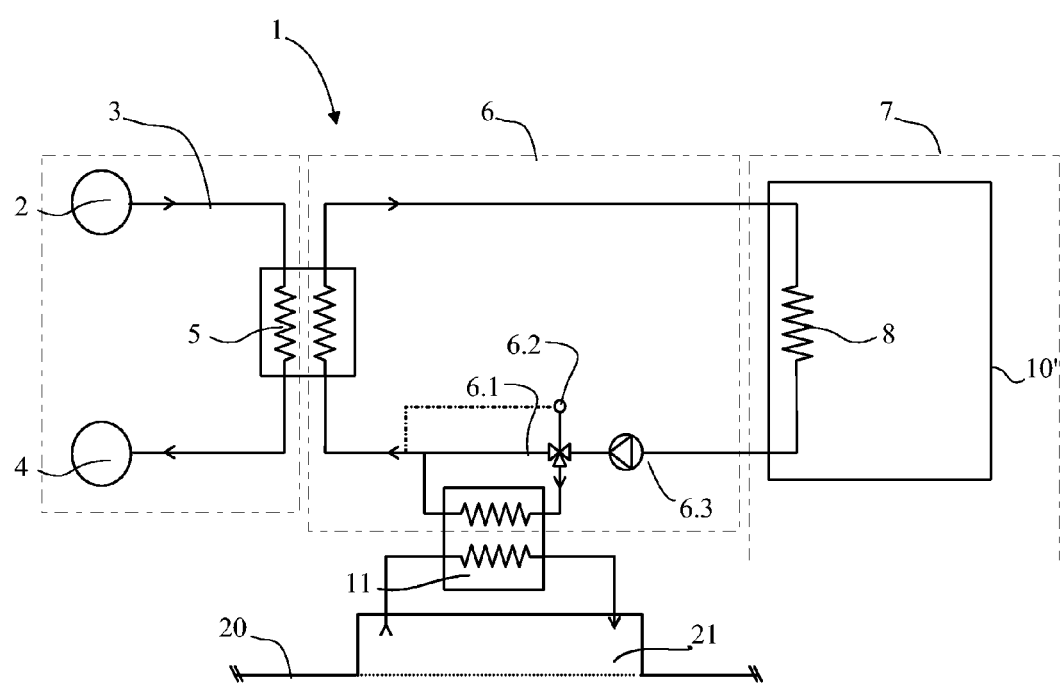
FIG. 3 illustrates a flow chart of another embodiment of the invention.

With the reference to FIGS. 1, 2 and 3 there is shown a marine vessel 20 operated by liquefied gas, like LNG, which is stored in a tank 2. In FIG. 1 there is shown a marine vessel 20 which has an engine of its propulsion system operated by gas. In this case the vessel is a passenger cruise vessel. Particularly in cruise vessels considerably much power is needed for cooling purposes and the cooling targets may be widely distributed in the vessel. The gas is stored in liquefied phase. The presentation of FIG. 1 is very schematic and only features necessary of understanding the context are shown. The description of embodiments of the invention is more accurately described with the reference to FIGS. 2 and 3.

Liquefied gas is stored typically at a temperature of −162° C. or somewhat higher temperature depending for example on the tank pressure. Before the gas may be introduced into the engine 4 of the vessel it must be evaporated into gaseous form and heated. For making that possible there is a gas evaporation/heating apparatus 5 provided in the arrangement. Evaporated and heated gas is led to the engine 4 to be combusted therein.

Evaporation of the liquefied gas requires energy and that is obtained by means of a medium (typically water-glycol) flowing in an intermediate flow circuit 6. The intermediate flow circuit brings heat to the evaporation/heating apparatus 5. The ship (or a marine vessel) 20 is also provided with cooling medium circuit (7), which conveys heat from a HVAC system 10 of the ship. The HVAC system is provided for air conditioning of the ship, or for providing cooling energy to a cold store 10'. According to the invention the intermediate flow circuit 6 is provided with the first heat exchanger 8 for transferring heat to the intermediate flow circuit 6 from the cooling medium circuit 7 which in FIG. 2 is connected to or is a part of an air conditioning system 10 of the vessel. Respectively, as is shown in FIG. 3 the HVAC system is a cooler in a cold store 10'.

The liquefied gas is evaporated with heat transferred from the intermediate flow medium which in turn is heated by the cooling medium circuit 7 and the cooling medium circuit is heated by a HVAC system of the ship. By cooling the HVAC process with this way it is possible save considerable amount of electrical power in the ship, thus saving the fuel. Also, the intermediate flow circuit makes it possible to distribute cooling energy widely and safely by making use of non-toxic fluid as water in the cooling medium circuit. The invention also minimizes the required volume of higher grade fluid (as refrigerant) in the intermediate flow circuit.

Due to low boiling temperature of the gas, evaporation is possible by making use of low temperature heat source, like also sea water. Thus, the arrangement is provided with a second heat exchanger 11 being in heat transfer connection with sea water. This is accomplished by providing a ducting between the second heat exchanger and e.g. a sea chest 21 of the vessel 20. The second heat exchanger 11 has a parallel by-pass 6.1 and a three way valve 6.2 being controlled based on temperature measurement of the medium flowing in the intermediate circuit 6. The intermediate flow circuit is also provided with a pump 6.3 for providing the circulation of the first flow circuit medium.

The cooling medium circuit 7 is also provided with a conventional cooling system 12 like compressor arrangement in case for situation when evaporation of liquefied gas is not performed. The operation of conventional system is controlled by a temperature measurement 7.2 and a by pass line 7.1.

It is clear that the invention is not limited to the examples mentioned above but can be implemented in many other different embodiments within the scope of the inventive idea.

The invention claimed is:

1. A marine vessel comprising:
   a storage container for liquefied gas,
   a propulsion system utilizing liquefied gas as fuel,
   a fuel feeding system for receiving fuel in liquid form from the storage container and supplying fuel to the propulsion system,
   a cooling medium circuit in which a non-toxic fluid circulates,
   an intermediate flow circuit in which a refrigerant circulates,
   a first heat exchanger for transferring heat from the non-toxic fluid circulating in the cooling medium circuit to the refrigerant circulating in to the intermediate flow circuit,
   a second heat exchanger for transferring heat to the refrigerant circulating in the intermediate flow circuit from a low temperature heat source, and
   a third heat exchanger for transferring heat from the refrigerant circulating in the intermediate circuit to fuel in the fuel feeding system, whereby fuel received in liquid form from the storage container is heated and converted to gaseous form and the fuel feeding system supplies the fuel in gaseous form to the propulsion system.

* * * * *